United States Patent
Eliaz

(10) Patent No.: US 8,571,131 B1
(45) Date of Patent: Oct. 29, 2013

(54) DYNAMIC FILTER ADJUSTMENT FOR HIGHLY-SPECTRALLY-EFFICIENT COMMUNICATIONS

(71) Applicant: MagnaCom Ltd., Moshav Ben Shemen (IL)

(72) Inventor: Amir Eliaz, Moshav Ben Shemen (IL)

(73) Assignee: MagnaCom Ltd. (IL)

( * ) Notice: Subject to any disclaimer, the term of this patent is extended or adjusted under 35 U.S.C. 154(b) by 0 days.

(21) Appl. No.: 13/755,008

(22) Filed: Jan. 31, 2013

Related U.S. Application Data

(60) Provisional application No. 61/662,085, filed on Jun. 20, 2012, provisional application No. 61/726,099, filed on Nov. 14, 2012, provisional application No. 61/729,774, filed on Nov. 26, 2012, provisional application No. 61/747,132, filed on Dec. 28, 2012.

(51) Int. Cl.
*H04B 15/00* (2006.01)

(52) U.S. Cl.
USPC .......................................................... 375/285

(58) Field of Classification Search
USPC .......... 375/286, 130, 219, 346; 332/120, 127, 332/128; 455/102
See application file for complete search history.

(56) References Cited

U.S. PATENT DOCUMENTS 6,563,862 B1 * 5/2003 Knutson et al. ............... 375/219
2002/0150184 A1 * 10/2002 Hafeez et al. ................. 375/346

OTHER PUBLICATIONS

Equalization: The Correction and Analysis of Degraded Signals, White Paper, Agilent Technologies, Ransom Stephens V1.0, Aug. 15, 2005 (12 pages).
Modulation and Coding for Linear Gaussian Channels, G. David Forney, Jr., and Gottfried Ungerboeck, IEEE Transactions of Information Theory, vol. 44, No. 6, Oct. 1998 pp. 2384-2415 (32 pages).
Intuitive Guide to Principles of Communications, www.complextoreal.com, Inter Symbol Interference (ISI) and Root-raised Cosine (RRC) filtering, (2002), pp. 1-23 (23 pages).
Chan, N., "Partial Response Signaling with a Maximum Likelihood Sequence Estimation Receiver" (1980). Open Access Dissertations and Theses. Paper 2855, (123 pages).
The Viterbi Algorithm, Ryan, M.S. and Nudd, G.R., Department of Computer Science, Univ. of Warwick, Coventry, (1993) (17 pages).
R. A. Gibby and J. W. Smith, "Some extensions of Nyquist's telegraph transmission theory," Bell Syst. Tech. J., vol. 44, pp. 1487-1510, Sep. 1965.

(Continued)

*Primary Examiner* — Khai Tran
(74) *Attorney, Agent, or Firm* — McAndrews, Held & Malloy, Ltd.

(57) ABSTRACT

A method and system for dynamic configuring of one or both of a transmitter pulse-shaping filter and a receiver pulse-shaping filter to generate a total partial response that incorporates a predetermined amount of inter-symbol interference (ISI). The predetermined amount of ISI is determined based on an estimation process during extraction of data from an output of the receiver pulse-shaping filter, such that performance of total partial-response-based communication matches or surpasses performance of communication incorporating filtering based on no or near-zero ISI. The reconfiguring may comprise obtaining data relating to changes affecting one or more of: the pulse-shaping filtering, and a channel and/or an interface used in the communication of data based on the total partial response, and adjusting the filter configuration, such as by determining a new optimized filtering configuration or changes to existing configurations (e.g., by applying a filtering optimization process).

36 Claims, 6 Drawing Sheets

(56) References Cited

OTHER PUBLICATIONS

J. E. Mazo and H. J. Landau, "On the minimum distance problem for faster-than-Nyquist signaling," IEEE Trans. Inform. Theory, vol. 34, pp. 1420-1427, Nov. 1988.

D. Hajela, "On computing the minimum distance for faster than Nyquist signaling," IEEE Trans. Inform. Theory, vol. 36, pp. 289-295, Mar. 1990.

G. Ungerboeck, "Adaptive maximum-likelihood receiver for carrier modulated data-transmission systems," IEEE Trans. Commun., vol. 22, No. 5, pp. 624-636, May 1974.

G. D. Forney, Jr., "Maximum-likelihood sequence estimation of digital sequences in the presence of intersymbol interference," IEEE Trans. Inform. Theory, vol. 18, No. 2, pp. 363-378, May 1972.

A. Duel-Hallen and C. Heegard, "Delayed decision-feedback sequence estimation," IEEE Trans. Commun., vol. 37, pp. 428-436, May 1989.

M. V. Eyubog •Iu and S. U. Qureshi, "Reduced-state sequence estimation with set partitioning and decision feedback," IEEE Trans. Commun., vol. 36, pp. 13-20, Jan. 1988.

W. H. Gerstacker, F. Obernosterer, R. Meyer, and J. B. Huber, "An efficient method for prefilter computation for reduced-state equalization," Proc. of the 11th IEEE Int. Symp. Personal, Indoor and Mobile Radio Commun. PIMRC, vol. 1, pp. 604-609, London, UK, Sep. 18-21, 2000.

W. H. Gerstacker, F. Obernosterer, R. Meyer, and J. B. Huber, "On prefilter computation for reduced-state equalization," IEEE Trans. Wireless Commun., vol. 1, No. 4, pp. 793-800, Oct. 2002.

Joachim Hagenauer and Peter Hoeher, "A Viterbi algorithm with soft-decision outputs and its applications," in Proc. IEEE Global Telecommunications Conference 1989, Dallas, Texas, pp. 1680-1686, Nov. 1989.

S. Mita, M. Izumita, N. Doi, and Y. Eto, "Automatic equalizer for digital magnetic recording systems" IEEE Trans. Magn., vol. 25, pp. 3672-3674, 1987.

E. Biglieri, E. Chiaberto, G. P. Maccone, and E. Viterbo, "Compensation of nonlinearities in high-density magnetic recording channels," IEEE Trans. Magn., vol. 30, pp. 5079-5086, Nov. 1994.

W. E. Ryan and A. Gutierrez, "Performance of adaptive Volterra equalizers on nonlinear magnetic recording channels," IEEE Trans. Magn., vol. 31, pp. 3054-3056, Nov. 1995.

X. Che, "Nonlinearity measurements and write precompensation studies for a PRML recording channel," IEEE Trans. Magn., vol. 31, pp. 3021-3026, Nov. 1995.

O. E. Agazzi and N. Sheshadri, "On the use of tentative decisions to cancel intersymbol interference and nonlinear distortion (with application to magnetic recording channels)," IEEE Trans. Inform. Theory, vol. 43, pp. 394-408, Mar. 1997.

\* cited by examiner

DYNAMIC FILTER ADJUSTMENT FOR HIGHLY-SPECTRALLY-EFFICIENT COMMUNICATIONS

CLAIM OF PRIORITY

This patent application makes reference to, claims priority to and claims benefit from:

U.S. Provisional Patent Application Ser. No. 61/662,085 entitled "Apparatus and Method for Efficient Utilization of Bandwidth" and filed on Jun. 20, 2012;

U.S. Provisional Patent Application Ser. No. 61/726,099 entitled "Modulation Scheme Based on Partial Response" and filed on Nov. 14, 2012;

U.S. Provisional Patent Application Ser. No. 61/729,774 entitled "Modulation Scheme Based on Partial Response" and filed on Nov. 26, 2012; and U.S. Provisional Patent Application Ser. No. 61/747,132 entitled "Modulation Scheme Based on Partial Response" and filed on Dec. 28, 2012.

Each of the above identified applications is hereby incorporated herein by reference in its entirety.

INCORPORATION BY REFERENCE

This application makes reference to:

U.S. patent application Ser. No. 13/754,964 titled "Low-Complexity, Highly-Spectrally-Efficient Communications," and filed on the same date as this application;

U.S. patent application Ser. No. 13/754,998 titled "Design and Optimization of Partial Response Pulse Shape Filter," and filed on the same date as this application;

U.S. patent application Ser. No. 13/755,001 titled "Constellation Map Optimization For Highly Spectrally Efficient Communications," and filed on the same date as this application;

U.S. patent application Ser. No. 13/755,011 titled "Timing Synchronization for Reception of Highly-Spectrally-Efficient Communications," and filed on the same date as this application;

U.S. patent application Ser. No. 13/755,018 titled "Feed Forward Equalization for Highly-Spectrally-Efficient Communications," and filed on the same date as this application;

U.S. patent application Ser. No. 13/755,021 titled "Decision Feedback Equalizer for Highly-Spectrally-Efficient Communications," and filed on the same date as this application;

U.S. patent application Ser. No. 13/755,025 titled "Decision Feedback Equalizer with Multiple Cores for Highly-Spectrally-Efficient Communications," and filed on the same date as this application;

U.S. patent application Ser. No. 13/755,026 titled "Decision Feedback Equalizer Utilizing Symbol Error Rate Biased Adaptation Function for Highly-Spectrally-Efficient Communications," and filed on the same date as this application;

U.S. patent application Ser. No. 13/755,028 titled "Coarse Phase Estimation for Highly-Spectrally-Efficient Communications," and filed on the same date as this application;

U.S. patent application Ser. No. 13/755,039 titled "Fine Phase Estimation for Highly Spectrally Efficient Communications," and filed on the same date as this application; and U.S. patent application Ser. No. 13/755,043 titled "Joint Sequence Estimation of Symbol and Phase with High Tolerance of Nonlinearity," and filed on the same date as this application.

Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

TECHNICAL FIELD

Aspects of the present application relate to electronic communications. More specifically, certain implementations of the present disclosure relate to dynamic filter adjustment for highly spectrally efficient communications.

BACKGROUND

Existing communications methods and systems are overly power hungry and/or spectrally inefficient. Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for dynamic filter adjustment for highly spectrally efficient communications, substantially as shown in and/or described in connection with at least one of the figures, as set forth more completely in the claims.

These and other advantages, aspects and novel features of the present disclosure, as well as details of illustrated implementation(s) thereof, will be more fully understood from the following description and drawings.

DETAILED DESCRIPTION

The present disclosure relates to a method and system for design and optimization of partial response pulse shape filter.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first plurality of lines of code and may comprise a second "circuit" when executing a second plurality of lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be performed by one or more circuits. As utilized herein, the term "exemplary" means serving as a non-limiting example, instance, or illustration. As utilized herein, the terms "for example" and "e.g.," introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
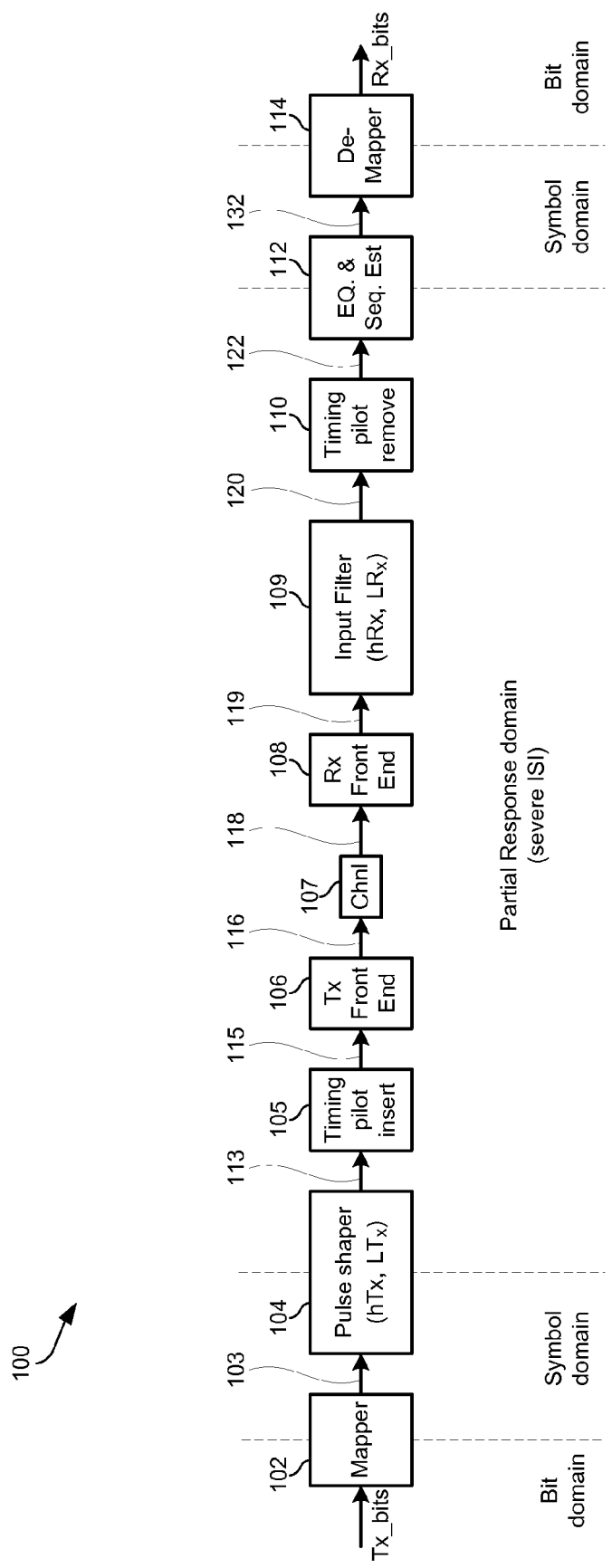
FIG. 1 is a block diagram depicting an example system configured for low-complexity, highly-spectrally-efficient communications.

FIG. 1 is a block diagram depicting an example system configured for low-complexity, highly-spectrally-efficient communications. The system 100 comprises a mapper circuit 102, a pulse shaping filter circuit 104, a timing pilot insertion circuit 105, a transmitter front-end circuit 106, a channel 107, a receiver front-end 108, a filter circuit 109, a timing pilot removal circuit 110, an equalization and sequence estimation circuit 112, and a de-mapping circuit 114. The components 102, 104, 105, and 106 may be part of a transmitter (e.g., a base station or access point, a router, a gateway, a mobile device, a server, a computer, a computer peripheral device, a table, a modem, a set-top box, etc.), the components 108, 109, 110, 112, and 114 may be part of a receiver (e.g., a base station or access point, a router, a gateway, a mobile device, a server, a computer, a computer peripheral device, a table, a modem, a set-top box, etc.), and the transmitter and receiver may communicate via the channel 107.

The mapper 102 may be operable to map bits of the Tx_bitstream to be transmitted to symbols according to a selected modulation scheme. The symbols may be output via signal 103. For example, for an quadrature amplitude modulation scheme having a symbol alphabet of N (N-QAM), the mapper may map each $Log_2(N)$ bits of the Tx_bitstream to single symbol represented as a complex number and/or as in-phase (I) and quadrature-phase (Q) components. Although N-QAM is used for illustration in this disclosure, aspects of this disclosure are applicable to any modulation scheme (e.g., amplitude shift keying (ASK), phase shift keying (PSK), frequency shift keying (FSK), etc.). Additionally, points of the N-QAM constellation may be regularly spaced ("on-grid") or irregularly spaced ("off-grid"). Furthermore, the symbol constellation used by the mapper may be optimized for best bit-error rate performance that is related to log-likelihood ratio (LLR) and to optimizing mean mutual information bit (MMIB). The Tx_bitstream may, for example, be the result of bits of data passing through a forward error correction (FEC) encoder and/or an interleaver. Additionally, or alternatively, the symbols out of the mapper 102 may pass through an interleaver.

The pulse shaper 104 may be operable to adjust the waveform of the signal 103 such that the waveform of the resulting signal 113 complies with the spectral requirements of the channel over which the signal 113 is to be transmitted. The spectral requirements may be referred to as the "spectral mask" and may be established by a regulatory body (e.g., the Federal Communications Commission in the United States or the European Telecommunications Standards Institute) and/or a standards body (e.g., Third Generation Partnership Project) that governs the communication channel(s) and/or standard(s) in use. The pulse shaper 104 may comprise, for example, an infinite impulse response (IIR) and/or a finite impulse response (FIR) filter. The number of taps, or "length," of the pulse shaper 104 is denoted herein as LTx, which is an integer. The impulse response of the pulse shaper 104 is denoted herein as hTx. The pulse shaper 104 may be configured such that its output signal 113 intentionally has a substantial amount of inter-symbol interference (ISI). Accordingly, the pulse shaper 104 may be referred to as a partial response pulse shaping filter, and the signal 113 may be referred to as a partial response signal or as residing in the partial response domain, whereas the signal 103 may be referred to as residing in the symbol domain. The number of taps and/or the values of the tap coefficients of the pulse shaper 104 may be designed such that the pulse shaper 104 is intentionally non-optimal for additive white Gaussian noise (AWGN) in order to improve tolerance of non-linearity in the signal path. In this regard, the pulse shaper 104 may offer superior performance in the presence of non-linearity as compared to, for example, a conventional zero (or near zero) positive ISI pulse shaping filter (e.g., root raised cosine (RRC) pulse shaping filter). The pulse shaper 104 may be designed as described in connection with at least some of the following figures (e.g., FIGS. 4-6), and in one or more of: the United States patent application titled "Design and Optimization of Partial Response Pulse Shape Filter," and the United States patent application titled "Constellation Map Optimization For Highly Spectrally Efficient Communications," each of which is incorporated by reference herein, as set forth above.

It should be noted that a partial response signal (or signals in the "partial response domain") is just one example of a type of signal for which there is correlation among symbols of the signal (referred to herein as "inter-symbol-correlated (ISC) signals"). Such ISC signals are in contrast to zero (or near zero) ISI signals generated by, for example, raised-cosine (RC) or root-raised-cosine (RRC) filtering. For simplicity of illustration, this disclosure focuses on partial response signals generated via partial response filtering. Nevertheless, aspects of this disclosure are applicable to other ISC signals such as, for example, signals generated via matrix multiplication (e.g., lattice coding), and signals generated via decimation below the Nyquist frequency such that aliasing creates correlation between symbols.

The timing pilot insertion circuit 105 may insert a pilot signal which may be utilized by the receiver for timing synchronization. The output signal 115 of the timing pilot insertion circuit 105 may thus comprise the signal 113 plus an inserted pilot signal (e.g., a sine wave at ¼×fbaud, where fbaud is the symbol rate). An example implementation of the pilot insertion circuit 105 is described in the United States patent application titled "Timing Synchronization for Reception of Highly-Spectrally-Efficient Communications," which is incorporated herein by reference, as set forth above.

The transmitter front-end 106 may be operable to amplify and/or upconvert the signal 115 to generate the signal 116. Thus, the transmitter front-end 106 may comprise, for example, a power amplifier and/or a mixer. The front-end may introduce non-linear distortion and/or phase noise (and/or other non-idealities) to the signal 116. The non-linearity of the circuit 106 may be represented as FnlTx which may be, for example, a polynomial, or an exponential (e.g., Rapp model). The non-linearity may incorporate memory (e.g., Voltera series).

The channel 107 may comprise a wired, wireless, and/or optical communication medium. The signal 116 may propagate through the channel 107 and arrive at the receive front-end 108 as signal 118. Signal 118 may be noisier than signal 116 (e.g., as a result of thermal noise in the channel) and may have higher or different ISI than signal 116 (e.g., as a result of multi-path).

The receiver front-end 108 may be operable to amplify and/or downconvert the signal 118 to generate the signal 119. Thus, the receiver front-end may comprise, for example, a low-noise amplifier and/or a mixer. The receiver front-end may introduce non-linear distortion and/or phase noise to the signal 119. The non-linearity of the circuit 108 may be represented as FnlRx which may be, for example, a polynomial, or an exponential (e.g., Rapp model). The non-linearity may incorporate memory (e.g., Voltera series).

The timing pilot recovery and removal circuit 110 may be operable to lock to the timing pilot signal inserted by the pilot insertion circuit 105 in order to recover the symbol timing of the received signal. The output 122 may thus comprise the signal 120 minus (i.e. without) the timing pilot signal. An example implementation of the timing pilot recovery and removal circuit 110 is described in the United States patent application titled "Timing Synchronization for Reception of Highly-Spectrally-Efficient Communications," which is incorporated herein by reference, as set forth above.

The input filter 109 may be operable to adjust the waveform of the partial response signal 119 to generate partial response signal 120. The input filter 109 may comprise, for example, an infinite impulse response (IIR) and/or a finite impulse response (FIR) filter. The number of taps, or "length," of the input filter 109 is denoted herein as LRx, an integer. The impulse response of the input filter 109 is denoted herein as hRx. The number of taps, and/or tap coefficients of the input filter 109 may be configured based on: a non-linearity model, $\tilde{F}nl$, signal-to-noise ratio (SNR) of signal 120, the number of taps and/or tap coefficients of the Tx partial response filter 104, and/or other parameters. The number of taps and/or the values of the tap coefficients of the input filter 109 may be configured such that noise rejection is intentionally compromised (relative to a perfect match filter) in order to improve performance in the presence of non-linearity. As a result, the input filter 109 may offer superior performance in the presence of non-linearity as compared to, for example, a conventional zero (or near zero) positive ISI matching filter (e.g., root raised cosine (RRC) matched filter). The input filter 109 may be designed as described in connection with at least some of the following figures (e.g., FIGS. 4-6), and in one or more of: the United States patent application titled "Design and Optimization of Partial Response Pulse Shape Filter," and the United States patent application titled "Constellation Map Optimization For Highly Spectrally Efficient Communications," each of which is incorporated herein by reference, as set forth above.

As utilized herein, the "total partial response (h)" may be equal to the convolution of hTx and hRx, and, thus, the "total partial response length (L)" may be equal to LTx+LRx−1. L may, however, be chosen to be less than LTx+LRx−1 where, for example, one or more taps of the Tx pulse shaper 104 and/or the Rx input filter 109 are below a determined level. Reducing L may reduce decoding complexity of the sequence estimation. This tradeoff may be optimized during the design of the system 100. The design and/or configuration of filters and/or filtering operations of the pulse shaper 104 and the input filter 109 (particularly, to realize the desired total partial response) may be optimized, such as described in more detail in the United States patent application titled "Design and Optimization of Partial Response Pulse Shape Filter," which is incorporated herein by reference, as set forth above. In this regard, the filter(s) used and/or filtering performed (e.g., at transmit-side and/or receive-side) during partial response pulse shaping may be optimized symmetrically (i.e. the linear phase) and/or asymmetrically (i.e. nonlinear phase). In this regard, in symmetric implementations the tap coefficients may be set symmetrically around zero, assuming the filter is centered around zero (i.e. tap coefficient function, h(k), is an even function that provides linear phase). Optimizing filters/filtering design and/or configuration may comprise, for example, optimizing Symbol Error Rate function of transmitter and receiver partial response taps; optimizing (weighted) minimal distance reduction (e.g., over transmit-side filter only or both transmit-side and receive-side filters); optimizing distance between a spectrum mask imposed on transmission and the response of the transmit-side filter incorporating nonlinear distortion model; optimizing non-compensated (residual) preceding taps of the total response (i.e. both the transmit-side and receive-side filters); optimizing noise enhancement of receiver side; reducing noise enhancement of receiver side in case of frequency selective fading (multipath) using transmit-side and/or receive-side filters; optimizing adjacent and/or interferes signals and noise folding caused by decimation (anti-aliasing) at the receiver; optimizing non-linear tolerance at the receiver originated at Tx side by the overall time domain response; and/or optimizing 'early' taps. In various embodiments of the invention, real-time (or near real-time) optimization of the transmit-side filter (e.g., pulse shaper 104) and/or receive-side filter (e.g., input filter 109) may be performed. In this regard, whereas conventional communications systems using legacy/existing filters (e.g., RRC pulse shaping filters) typically use fixed filter implementations (i.e. the filters typically cannot be altered because doing so may result in an unacceptable amount of ISI), communications in accordance with various embodiments of this disclosure may be designed to handle and/or provide a dynamic pulse shaping and/or dynamically changing ISI. Thus, in various embodiments, characteristics of the partial-response pulse shaping filters/filtering may be adapted and/or modified in real-time (e.g., in response to signals recently and/or currently being communicated). In other words, filters/filtering used in the communication path (e.g., for partial response pulse shaping) may be configured during run-time of the transmitter and/or receiver (e.g., in, or near, real-time) based, for example, on recently received signals and/or signals currently being received. For example, in instances where multipath may occur, it may be undesirable to apply transmit energy in frequencies which may be blocked or faded. Such optimization may be achieved in PR based schemes by, for example, adjusting the partial response and thus the pulse shaping. This may be achieved by dynamically changing the shape of the filter(s), to decrease the power centered on the blocked faded frequencies (e.g., from multipath). That may refer as transmitter equalization. In various implementations, adjustments to filters/filtering utilized in conjunction with PR based pulse shaping may be determined based on particular conditions or changes thereto (e.g., current settings, measurements, and the like) which may be determined to affect the filter(s), filtering operations, pulse shaping, communications, and/or overall performance. For example, filters/filtering utilized for partial response based pulse shaping may be adjusted, preferably in real-time or near real-time, such as based on particular changes that pertain to transmit-side filter(s), receive-side filter(s), other components in the transmitter and/or the receiver used during communications between the transmitter and the receiver, and/or interface(s) or channel(s) used in communications between the transmitter and the receiver. Furthermore, in some instances, filtering operations may comprise use of adaptive transmit-side and/or receive-side filters—that is, the filters design or configuration may be adaptive based on particular criteria, objectives, and/or constraints (e.g., the filters may be configured for adaptive baud rate vs. minimal distance reduction, based on such parameters or criteria as link condition parameters (e.g., fading), SER, and/or other performance indication measurements (e.g., any parameters that may pertain to receiver ability to recover timing needed for information detection), for example). Accordingly, real-time and/or dynamic filters/filtering adjustments may also be implemented in adaptive manner—i.e. in accordance with applicable parameters, criteria, objectives, and/or constraints. Real-time optimization (or examples thereof) is described in more detail in connection with at least some of the following figures, such as FIGS. 4-6 for example.

The equalizer and sequence estimator 112 may be operable to perform an equalization process and a sequence estimation process. Details of an example implementation of the equalizer and sequence estimator 112 are described below with respect to FIG. 2. The output signal 132 of the equalizer and sequence estimator 112 may be in the symbol domain and may carry estimated values of corresponding transmitted symbols (and/or estimated values of the corresponding transmitted information bits of the Tx_bitstream) of signal 103. Although not depicted, the signal 132 may pass through an interleaver en route to the de-mapper 114. The estimated values may comprise soft-decision estimates, hard-decision estimates, or both.

The de-mapper 114 may be operable to map symbols to bit sequences according to a selected modulation scheme. For example, for an N-QAM modulation scheme, the mapper may map each symbol to $\text{Log}_2(N)$ bits of the Rx_bitstream. The Rx_bitstream may, for example, be output to a de-interleaver and/or an FEC decoder. Alternatively, or additionally, the de-mapper 114 may generate a soft output for each bit, referred as LLR (Log-Likelihood Ratio). The soft output bits may be used by a soft-decoding forward error corrector (e.g. a low-density parity check (LDPC) decoder). The soft output bits may be generated using, for example, a Soft Output Viterbi Algorithm (SOVA) or similar. Such algorithms may use additional information of the sequence decoding process including metrics levels of dropped paths and/or estimated bit probabilities for generating the LLR, where $$LLR(b) = \log\left(\frac{P_b}{1 - P_b}\right),$$

where $P_b$ is the probability that bit b=1.

In an example implementation, components of the system upstream of the pulse shaper 104 in the transmitter and downstream of the equalizer and sequence estimator 112 in the receiver may be as found in a conventional N-QAM system. Thus, through modification of the transmit side physical layer and the receive side physical layer, aspects of the invention may be implemented in an otherwise conventional N-QAM system in order to improve performance of the system in the presence of non-linearity as compared, for example, to use of RRC filters and an N-QAM slicer.

Figure 2:
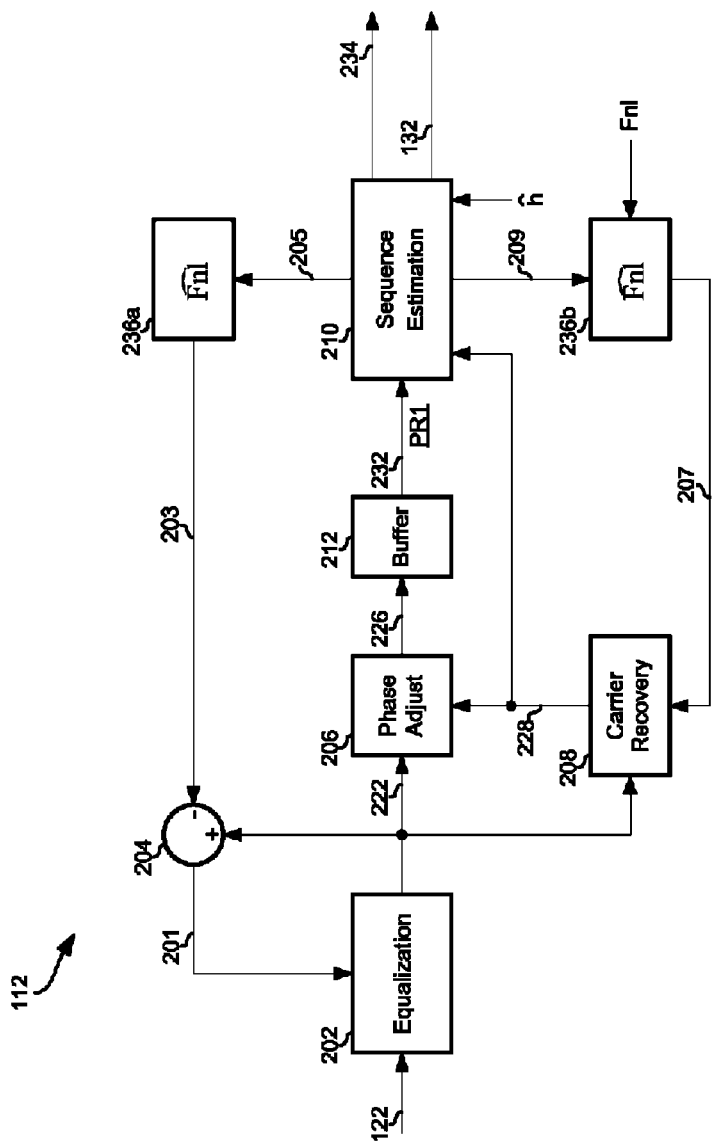
FIG. 2 is a block diagram depicting an example equalization and sequence estimation circuit for use in a system configured for low-complexity, highly-spectrally-efficient communications.

FIG. 2 is a block diagram depicting an example equalization and sequence estimation circuit for use in a system configured for low-complexity, highly-spectrally-efficient communications. Shown are an equalizer circuit 202, a signal combiner circuit 204, a phase adjust circuit 206, a sequence estimation circuit 210, and non-linearity modeling circuits 236a and 236b.

The equalizer 202 may be operable to process the signal 122 to reduce ISI caused by the channel 107. The output 222 of the equalizer 202 is a partial response domain signal. The ISI of the signal 222 is primarily the result of the pulse shaper 104 and the input filter 109 (there may be some residual ISI from multipath, for example, due to use of the least means square (LMS) approach in the equalizer 202). The error signal, 201, fed back to the equalizer 202 is also in the partial response domain. The signal 201 is the difference, calculated by combiner 204, between 222 and a partial response signal 203 that is output by non-linearity modeling circuit 236a. An example implementation of the equalizer is described in the United States patent application titled "Feed Forward Equalization for Highly-Spectrally-Efficient Communications," which is incorporated herein by reference, as set forth above.

The carrier recovery circuit 208 may be operable to generate a signal 228 based on a phase difference between the signal 222 and a partial response signal 207 output by the non-linearity modeling circuit 236b. The carrier recovery circuit 208 may be as described in the United States patent application titled "Coarse Phase Estimation for Highly-Spectrally-Efficient Communications," which is incorporated herein by reference, as set forth above.

The phase adjust circuit 206 may be operable to adjust the phase of the signal 222 to generate the signal 226. The amount and direction of the phase adjustment may be determined by the signal 228 output by the carrier recovery circuit 208. The signal 226 is a partial response signal that approximates (up to an equalization error caused by finite length of the equalizer 202, a residual phase error not corrected by the phase adjust circuit 206, non-linearities, and/or other non-idealities) the total partial response signal resulting from corresponding symbols of signal 103 passing through pulse shaper 104 and input filter 109.

The buffer 212 buffers samples of the signal 226 and outputs a plurality of samples of the signal 226 via signal 232. The signal 232 is denoted PR1, where the underlining indicates that it is a vector (in this case each element of the vector corresponds to a sample of a partial response signal). In an example implementation, the length of the vector PR1 may be Q samples.

Input to the sequence estimation circuit 210 are the signal 232, the signal 228, and a response ĥ. Response ĥ is based on h (the total partial response, discussed above). For example, response ĥ may represent a compromise between h (described above) and a filter response that compensates for channel non-idealities such as multi-path. The response ĥ may be conveyed and/or stored in the form of LTx+LRx−1 tap coefficients resulting from convolution of the LTx tap coefficients of the pulse shaper 104 and the LRx tap coefficients of the input filter 109. Alternatively, response ĥ may be conveyed and/or stored in the form of fewer than LTx+LRx−1 tap coefficients—for example, where one or more taps of the LTx and LRx is ignored due to being below a determined threshold. The sequence estimation circuit 210 may output partial response feedback signals 205 and 209, a signal 234 that corresponds to the finely determined phase error of the signal 120, and signal 132 (which carries hard and/or soft estimates of transmitted symbols and/or transmitted bits). An example implementation of the sequence estimation circuit 210 is described below with reference to FIG. 3.

The non-linear modeling circuit 236a may apply a non-linearity function $\hat{F}nl$ (a model of the non-linearity seen by the received signal en route to the circuit 210) to the signal 205 resulting in the signal 203. Similarly, the non-linear modeling circuit 236b may apply the non-linearity function $\hat{F}nl$ to the signal 209 resulting in the signal 207. $\hat{F}nl$ may be, for example, a third-order or fifth-order polynomial. Increased accuracy resulting from the use of a higher-order polynomial for $\hat{F}nl$ may tradeoff with increased complexity of implementing a higher-order polynomial. Where FnITx is the dominant non-linearity of the communication system 100, $\hat{F}nl$ modeling only FnITx may be sufficient. Where degradation in receiver performance is above a threshold due to other non-linearities in the system (e.g., non-linearity of the receiver front-end 108) the model $\hat{F}nl$ may take into account such other non-linearities.

Figure 3:
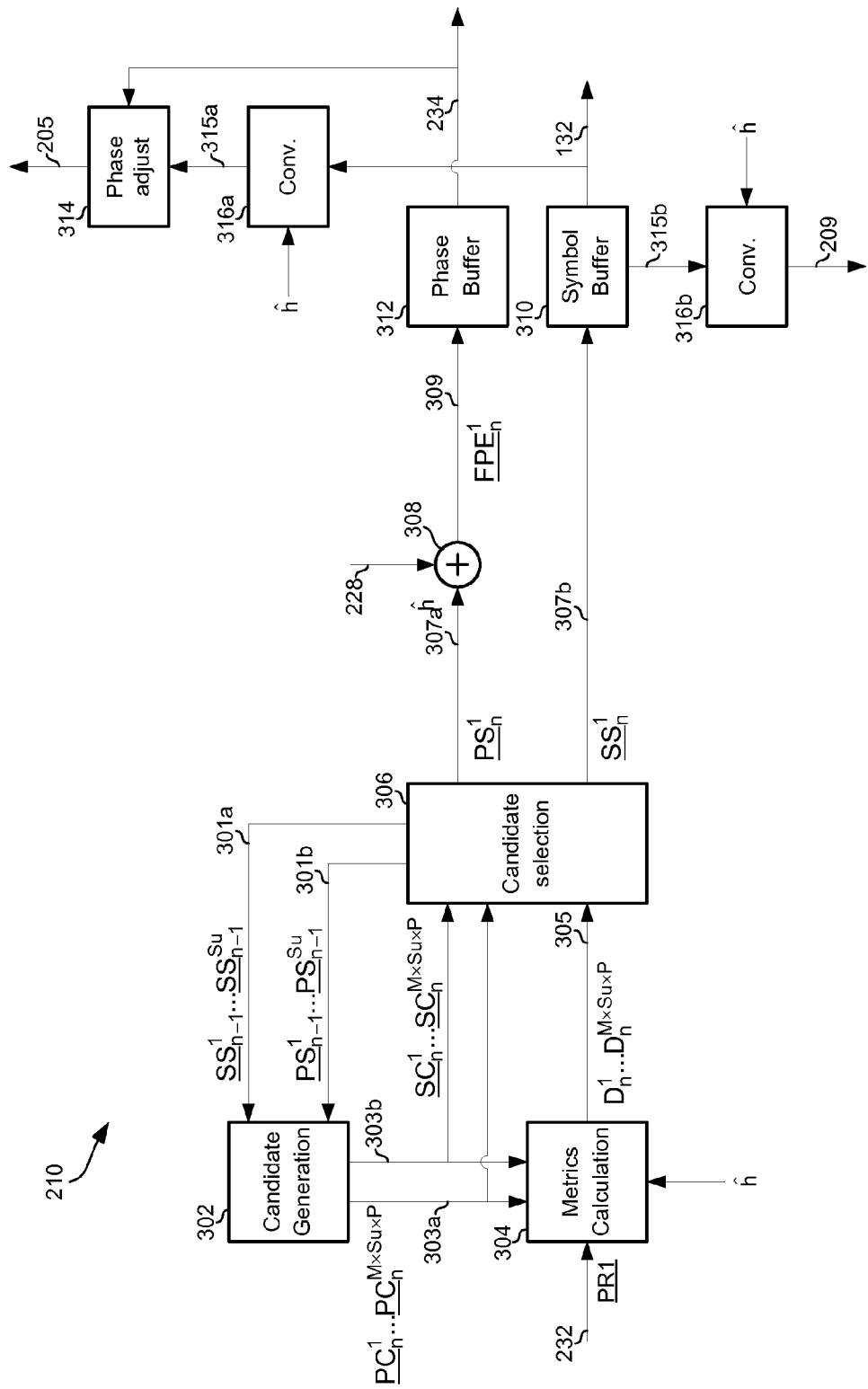
FIG. 3 is a block diagram depicting an example sequence estimation circuit for use in a system configured for low-complexity, highly-spectrally-efficient communications.

FIG. 3 is a block diagram depicting an example sequence estimation circuit for use in a system configured for low-complexity, highly-spectrally-efficient communications. Shown are a candidate generation circuit 302, a metrics calculation circuit 304, a candidate selection circuit 306, a combiner circuit 308, a buffer circuit 310, a buffer circuit 312, a phase adjust circuit 314, and convolution circuits 316a and 316b. The sequence estimation process described with respect to FIG. 3 is an example only. Many variations of the sequence estimation process are also possible. For example, although the implementation described here uses one phase survivor per symbol survivor, another implementation may have PSu (e.g., PSu<Su) phase survivors that will be used commonly for each symbol survivor.

For each symbol candidate at time n, the metrics calculation circuit 304 may be operable to generate a metric vector $D_n^1 \ldots D_n^{M \times Su \times P}$ based on the partial response signal PR1, the signal 303a conveying the phase candidate vectors $PC_n^1 \ldots PC_n^{M \times Su \times P}$, and the signal 303b conveying the symbol candidate vectors $SC_n^1 \ldots SC_n^{M \times Su \times P}$, where underlining indicates a vector, subscript n indicates that it is the candidate vectors for time n, M is an integer equal to the size of the symbol alphabet (e.g., for N-QAM, M is equal to N), Su is an integer equal to the number of symbol survivor vectors retained for each iteration of the sequence estimation process, and P is an integer equal to the size of the phase alphabet. In an example implementation, the size of phase alphabet is three, with each of the three symbols corresponding to one of: a positive shift, a negative phase shift, or zero phase shift, as further described in the United States patent application titled "Low-Complexity, Highly-Spectrally-Efficient Communications," and in the United States patent application titled "Fine Phase Estimation for Highly Spectrally Efficient Communications," each of which is incorporated herein by reference, as set forth above. In an example implementation, each phase candidate vector may comprise Q phase values and each symbol candidate vector may comprise Q symbols. An example implementation of the metrics calculation block is described in the United States patent application titled "Low-Complexity, Highly-Spectrally-Efficient Communications," which is incorporated herein by reference, as set forth above.

The candidate selection circuit 306 may be operable to select Su of the symbol candidates $SC_n^1 \ldots SC_n^{M \times Su \times P}$ and Su of the phase candidates $PC_n^1 \ldots PC_n^{M \times Su \times P}$ based on the metrics $D_n^1 \ldots D_n^{M \times Su \times P}$. The selected phase candidates are referred to as the phase survivors $PS_n^1 \ldots PS_n^{Su}$. Each element of each phase survivors $PS_n^1 \ldots PS_n^{Su}$ may correspond to an estimate of residual phase error in the signal 232. That is, the phase error remaining in the signal after coarse phase error correction via the phase adjust circuit 206. The best phase survivor $PS_n^1$ is conveyed via signal 307a. The Su phase survivors are retained for the next iteration of the sequence estimation process (at which time they are conveyed via signal 301b). The selected symbol candidates are referred to as the symbol survivors $SS_n^1 \ldots SS_n^{Su}$. Each element of each symbol survivors $SS_n^1 \ldots SS_n^{Su}$ may comprise a soft-decision estimate and/or a hard-decision estimate of a symbol and/or information bits of the signal 232. The best symbol survivor $SS_n^1$ is conveyed to symbol buffer 310 via the signal 307b. The Su symbol survivors are retained for the next iteration of the sequence estimation process (at which time they are conveyed via signal 301a). Although, the example implementation described selects the same number, Su, of phase survivors and symbol survivors, such is not necessarily the case. Operation of example candidate selection circuits 306 are described in the United States patent application titled "Low-Complexity, Highly-Spectrally-Efficient Communications," which is incorporated herein by reference, as set forth above.

The candidate generation circuit 302 may be operable to generate phase candidates $PC_n^1 \ldots PC_n^{M \times Su \times P}$ and symbol candidates $SC_n^1 \ldots SC_n^{M \times Su \times P}$ from phase survivors $PS_{n-1}^1 \ldots PS_{n-1}^{Su}$ and symbol survivors $SS_{n-1}^1 \ldots SS_{n-1}^{Su}$, wherein the index n−1 indicates that they are survivors from time n−1 are used for generating the candidates for time n. In an example implementation, generation of the phase and/or symbol candidates may be as, for example, described in one or more of: the United States patent application titled "Low-Complexity, Highly-Spectrally-Efficient Communications," and the United States patent application titled "Joint Sequence Estimation of Symbol and Phase with High Tolerance of Nonlinearity," each of which is incorporated herein by reference, as set forth above.

The symbol buffer circuit 310 may comprise a plurality of memory elements operable to store one or more symbol survivor elements of one or more symbol survivor vectors. The phase buffer circuit 312 may comprise a plurality of memory elements operable to store one or more phase survivor vectors. Example implementations of the buffers 310 and 312 are described in the United States patent application titled "Low-Complexity, Highly-Spectrally-Efficient Communications," which is incorporated herein by reference, as set forth above.

The combiner circuit 308 may be operable to combine the best phase survivor, $PS_n^1$, conveyed via signal 307a, with the signal 228 generated by the carrier recovery circuit 208 (FIG. 2) to generate fine phase error vector $FPE_n^1$, conveyed via signal 309, which corresponds to the finely estimated phase error of the signal 222 (FIG. 2). At each time n, fine phase error vector $FPE_{n-1}^1$ stored in phase buffer 312 may be overwritten by $FPE_n^1$.

The phase adjust circuit 314 may be operable to adjust the phase of the signal 315a by an amount determined by the signal 234 output by phase buffer 312, to generate the signal 205.

The circuit 316a, which performs a convolution, may comprise a FIR filter or IIR filter, for example. The circuit 316a may be operable to convolve the signal 132 with response $\hat{h}$, resulting in the partial response signal 315a. Similarly, the convolution circuit 316b may be operable to convolve the signal 317 with response $\hat{h}$, resulting in the partial response signal 209. As noted above, response $\hat{h}$ may be stored by, and/or conveyed to, the sequence estimation circuit 210 in the form of one or more tap coefficients, which may be determined based on the tap coefficients of the pulse shaper 104 and/or input filter 109 and/or based on an adaptation algorithm of a decision feedback equalizer (DFE). Response $\hat{h}$ may thus represent a compromise between attempting to perfectly reconstruct the total partial response signal (103 as modified by pulse shaper 104 and input filter 109) on the one hand, and compensating for multipath and/or other non-idealities of the channel 107 on the other hand. In this regard, the system 100 may comprise one or more DFEs as described in one or more of: the United States patent application titled "Decision Feedback Equalizer for Highly-Spectrally-Efficient Communications," the United States patent application titled "Decision Feedback Equalizer with Multiple Cores for Highly-Spectrally-Efficient Communications," and the United States patent application titled "Decision Feedback Equalizer Utilizing Symbol Error Rate Biased Adaptation Function for Highly-Spectrally-Efficient Communications," each of which is incorporated herein by reference, as set forth above.

Thus, signal 203 is generated by taking a first estimate of transmitted symbols, (an element of symbol survivor $SS_n^1$ $SS_n^1$), converting the first estimate of transmitted symbols to the partial response domain via circuit 316a, and then compensating for non-linearity in the communication system 100 via circuit 236a (FIG. 2). Similarly, signal 207 is generated from a second estimate of transmitted symbols (an element of symbol survivor $SS_n^1$) that is converted to the partial response domain by circuit 316b to generate signal 209, and then applying a non-linear model to the signal 209b to compensate for non-linearity in the signal path.

Figure 4:
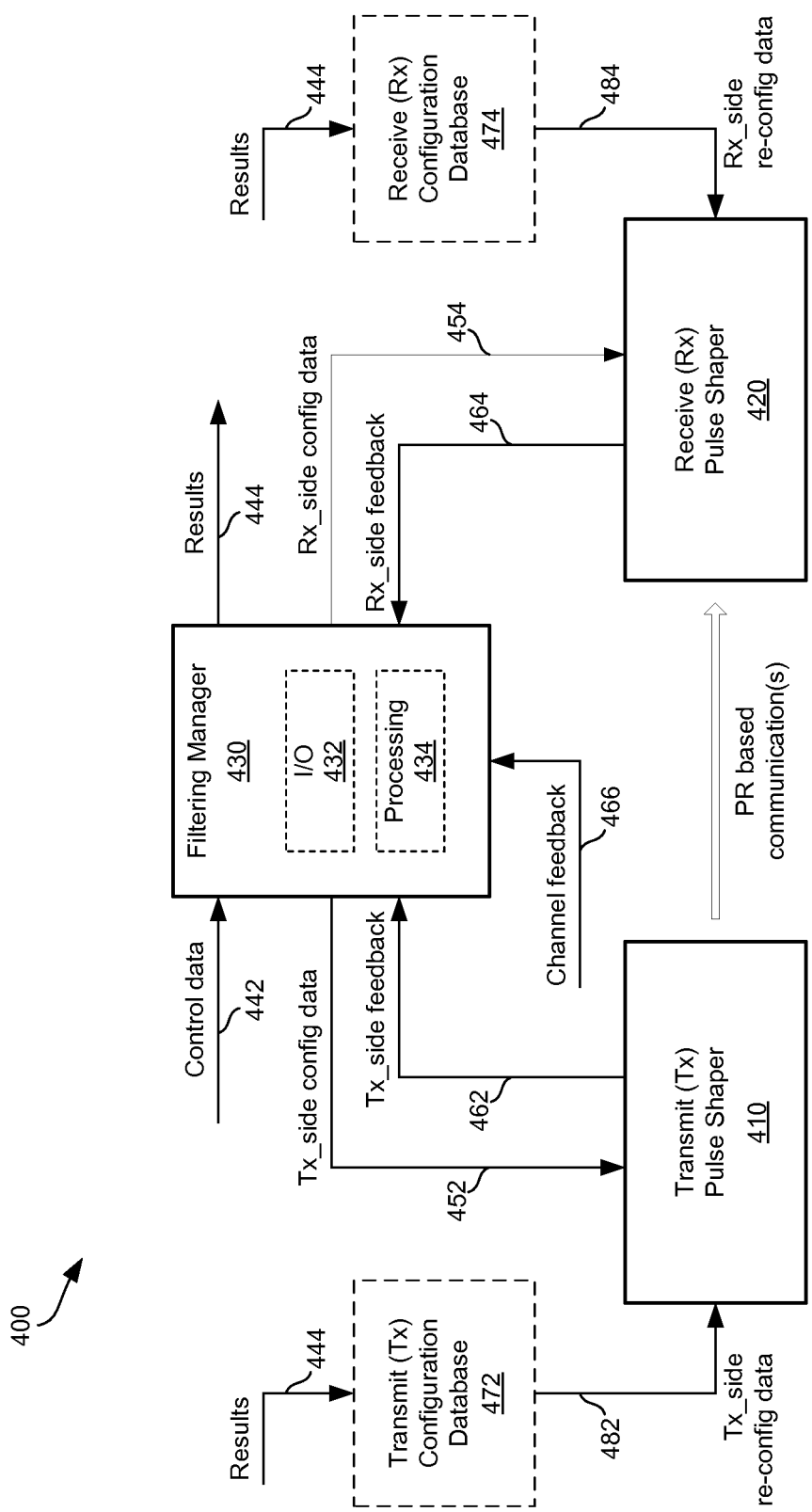
FIG. 4 is a block diagram depicting an example partial response pulse-shaping filtering setup for use in a system configured for low-complexity, highly-spectrally-efficient communications.

FIG. 4 is a block diagram depicting an example partial response pulse-shaping filtering setup for use in a system configured for low-complexity, highly-spectrally-efficient communications. Referring to FIG. 4, there is shown a filtering system 400, which may comprise a transmit (Tx) pulse-shaper 410, a receive (Rx) pulse-shaper 420, and a filtering manager 430.

Each of the Tx pulse-shaper 410 and the Rx pulse-shaper 420 may comprise suitable circuitry, interfaces, logic, and/or code for performing pulse shaping, such as during communication of data between a transmitter and a receiver which may comprise the Tx pulse-shaper 410 and the Rx pulse-shaper 420, respectively. The Tx pulse-shaper 410 and the Rx pulse-shaper 420 may correspond to the pulse shaper 104 and the input filter 109, respectively, of FIG. 1. In this regard, the Tx pulse-shaper 410 and the Rx pulse-shaper 420 may enable adjusting signal waveforms (e.g., of communicated signals) such as to comply with particular spectral requirements (i.e. the "spectral masks") of communication channels that may be used. The waveform adjustments provided by the Tx pulse-shaper 410 and the Rx pulse-shaper 420 may entail various processing operations and/or functions, particularly filtering. In this regard, processing signals by the Tx pulse-shaper 410 and the Rx pulse-shaper 420 may comprise filtering. For example, filtering may be performed (at the transmit-side and the receive-side) to ensure that communicated signals conform to the applicable spectral mask(s) and/or to ensure successful and/or proper recovery of signals at the receiver side.

The Tx pulse-shaper 410 and the Rx pulse-shaper 420 may be implemented using various types of filters, including, for example, infinite impulse response (IIR) filters and/or finite impulse response (FIR) filters. The invention is not necessarily limited, however, to any particular type of filter. In various embodiments of the invention, the pulse-shaper 410 and the Rx pulse-shaper 420 may be configured to provide partial response pulse-shaping, substantially as described with respect to FIG. 1, for example. In this regard, partial response pulse shaping may comprise generating (and/or handling) waveforms that intentionally incorporate a substantial amount of inter-symbol interference (ISI). Allowing such a substantial amount of ISI may provide enhanced communication performance. For example, partial response based modulation, as compared to legacy and/or existing modulation schemes, may allow for use of less bandwidth for communicating the same amount of data (and with the similar error rates), for communication of same amount of data over same bandwidth but with lower power consumption, and/or for communication more data with similar bandwidth. Accordingly, while legacy/existing pulse shaping (and particularly filtering related thereto) may be configured to have no-ISI (or minimal amount of ISI—e.g., corresponding to applicable error rates), the PR based modulation applied using the Tx pulse-shaper 410 and the Rx pulse-shaper 420 may be implemented to operate with a substantial amount of ISI.

The filtering manager 430 may comprise suitable circuitry, interfaces, logic, and/or code that may be operable to manage filtering related processing, such as filtering processing performed via one or both of the Tx pulse-shaper 410, the Rx pulse-shaper 420. In this regard, filtering management may comprise configuring filters and/or filtering operations to meet spectrum mask limitations according to an underlying communication/modulation standard without degrading demodulation performance. Thus, the filtering manager 430 may be operable to determine and/or provide filtering configuration related parameters to one or both of the Tx pulse-shaper 410 and the Rx pulse-shaper 420 (Tx_side configuration data 452 and Rx_side configuration data 454, respectively). In this regard, the configuration data may comprise, for example, filtering configuration parameters such as number of filter taps and/or filter coefficients values.

In various implementations, the filtering manager 430 may be configured to implement and/or execute filtering optimization processes. In this regard, the filtering optimization processes may be used to determine filtering configurations that optimize filtering operations based on particular criteria or conditions (e.g., for partial-response-based filtering). For example, the filtering manager 430 may be used to perform filtering optimization processes, which may be based on, for example, control data 442 that may comprise preconfigured criteria or user inputs (e.g., definitions, preferences, etc.), to produce optimized filter coefficient values (e.g., for the Tx pulse-shaper 410 and the Rx pulse-shaper 420). In some instances, the optimization processes may also be based on information pertaining to and/or provided by the transmitter, the receiver, and/or the communication channels/links. The results 444 of the optimization process (e.g., optimized filter configuration parameters) may be used in generating the Tx_side configuration data 452 and Rx_side configuration data 454 which may be sent directly to the filters and/or may be outputted to the users (e.g., to system designers or operators), such as using log files or screens.

In some implementations, the filtering manager 430 may be configured to support dynamic and/or real-time adjustments of filters/filtering, such as to ensure highly spectrally efficient communications. In this regard, the filtering manager 430 may be operable to determine and/or apply new filters/filtering configuration and/or operations, and/or to determine adjustments to currently-used filters/filtering configuration and/or operations. The new configurations and/or operations, and/or adjustments to configurations and/or operations, may be determined based on data pertaining to various conditions and/or parameters (e.g., pulse shaping or filtering) that may be affected by partial-response-based communication. Such data may be obtained autonomously (i.e. directly by the filtering manager 430) and/or may be received from other entities (e.g., from the transmitter and/or the receiver). For example, the filtering manager 430 may be configured to receive transmit-side (Tx_side) feedback 462, receive-side (Rx_side) feedback 464, and/or channel feedback 466.

The filtering manager 430 may comprise various components and/or subsystems which may be utilized during filtering management. For example, in some instances, the filtering manager 430 may comprise an input/output (I/O) component 432, which may incorporate various I/O mechanisms or devices (e.g., mice, keyboards, keypads, user interface, displays, touch screens or touchpads, and the like) to enable interacting with users (e.g., system designers and/or operators). In this regard, the I/O component 432 may be used to allow inputting control data or commands, such as implementation-specific parameters, variables, constraints and cost functions that may define the desired optimization. The I/O component 432 may also be used to allow outputting data to the system users. For example, the I/O component 432 may comprise suitable graphic user interfaces (GUIs) and/or interface (e.g., a file transfer interface) for acknowledging (or repeating—e.g., for confirmation) user inputs, and/or to provide corresponding output (e.g., optimization results), such as suitable filter tap coefficients or other configuration parameters, for example.

The filtering manager 430 may also comprise a processing component 434, which may be configured to perform various processing functions or tasks in support of operations performed by the filtering manager 430. For example, the processing component 434 may be used to implement and/or execute any filtering optimization processes that may be supported by the filtering manager 430 (e.g., PR filtering optimization process). In this regard, designing and/or configuring filtering operations may entail analysis of the spectrum response of any filters used (at the transmit-side and/or the receive-side). The spectrum response may be calculated using, for example, Fourier transform. In this regard, the spectrum response of the PR signal (i.e. the total partial response of the system) may be calculated or estimated using, for example, a model for nonlinear distortion (e.g., 3rd order polynomial, or Voltera series).

The filtering manager 430 may be implemented as a dedicated, stand-alone system or device (e.g., general-purpose computer, dedicated controller, or the like), which may be connected (e.g., using wireless and/or wired connections, based on any appropriate interface/standard) to one or both of the transmitter and receiver comprising the Tx pulse-shaper 410, the Rx pulse-shaper 420, respectively, to enable interactions therewith during filtering management. Alternatively, in some instances, at least a portion of the filtering manager 430 (and/or functions or operations performed thereby) may be incorporated into the transmitter and/or the receiver, or component(s) thereof. In some instances, the filtering manager 430 may be implemented in distributed manner, with components and/or functions thereof being distributed among the transmitters, the receiver, and/or a stand-alone device/system. In some instances, the filter manager 430 may be configured to optimize filtering processing in the Tx pulse-shaper 410 and/or the Rx pulse-shaper 420.

In operation, the Tx pulse shaper 410 and the Rx pulse shaper 420 may be used to provide pulse shaping—e.g., waveform adjustments based on particular spectral masks, channel response (e.g., multipath), nonlinearity, symbol constellation, etc.—and/or noise rejection. Such operations would typically entail performing filtering. In this regard, the filter manager 430 may be used to configure, control, and/or manage filtering performed by the Tx pulse shaper 410 and/or the Rx pulse shaper 420. For example, the Tx pulse shaper 410 and the Rx pulse shaper 420 may be implemented using infinite impulse response (IIR) filters and/or finite impulse response (FIR) filters, and as such configuring, controlling, and/or managing filtering may comprise, inter alia, determining or setting the number of taps (or "length") and/or the values of the tap coefficients of the Tx pulse shaper 410 and the Rx pulse shaper 420. In this regard, the number of taps may comprise the number of filter taps for each of the Tx pulse shaper 410 and the Rx pulse shaper 420, and/or the total number of taps (i.e. combined number of taps of both of the Tx pulse shaper 410 and the Rx pulse shaper 420).

In some instances, the Tx pulse shaper 410 and/or the Rx pulse shaper 420 may be configured for use in conjunction with partial response based communications. In this regard, one distinction between a partial response (PR) based scheme and existing/legacy schemes pertains to inter-symbol interference (ISI). Inter-symbol interference (ISI) is typically undesired, and existing/legacy schemes are typically tailored to eliminate or significantly minimize ISI (e.g., either being configured to achieve zero ISI or near-zero ISI, or when allowing for ISI it would be minimal amount, typically based on specified acceptable error rates). Achieving such zero (or near-zero) ISI usually comes at the expense of the baud rate (or the bandwidth efficiency)—e.g., being significantly worse than the channel's Shannon capacity bound.

For example, most existing filtering implementations, particularly Root Raised Cosine (RRC) and/or Raised Cosine (RC) based implementations, are typically configured to have near-zero ISI, to assure demodulating performance. For example, with RRC-based implementations, RRC-based filters would typically be used in both of the transmitter and receiver, serving as pulse shaping filter and match filter, respectively. The challenge in RRC-based filter design is to adjust the truncated and quantized RRC taps to meet spectrum mask limitations without generating inherent ISI. In this regard, the conventional root raised cosine (RRC) pulse shaping filter is an even function to assure linear phase response (i.e. the time domain filter response is symmetric) and the length of the casual part is equal or similar to the non-casual. The modulated signal, which is the convolution between the filter taps and the symbols, may incorporate peaks that are associated with nonlinear distortion that typically cannot be compensated in the receiver because the non-casual part may not be known to the receiver.

In partial response (PR) based communications as implemented in accordance with aspects of the present invention, however, end-to-end system/path (particularly the Tx pulse shaper 410 and the Rx pulse shaper 420) may be configured such that signals communicated between the transmitter and the receiver would intentionally have a substantial amount of inter-symbol interference (ISI). In this regard, allowing for substantial amount of ISI may allow for increasing the symbol rate (and/or reducing required bandwidth), which may allow, when drawbacks of having substantial ISI are mitigated (e.g., through signal processing techniques in the receiver) for enhanced performance. In other words, use of partial response pulse shaping may allow for generating signals with particular inherent and substantial amount of ISI such that to enable compressing the signal spectrum to allow improved spectral efficiency. In this regard, ISI level allowed in partial response based implementations may be worse than the threshold signal-to-noise ratio (SNR) whereas in legacy systems/schemes, which typically have near zero ISI (having similar spectral efficiency), the ISI level would typically be much better than threshold SNR. For example, in a legacy system that is configured (e.g., based on particular standard)

to have particular SNR threshold (e.g., 30 dB), the ISI, which would be treated as an interference and thus factor into the overall noise, would have to be negligible (e.g., be 20 to 30 dB down from the SNR threshold). On the other hand, in a corresponding partial response based implementation that specifically allows for the presence of ISI (and account for it in the PR based estimation process), the ISI may be substantial relative to the same SNR threshold (30 dB) since it does not be counted as noise (e.g., ISI can be equal to or greater than the SNR threshold of 30 dB).

Therefore, to achieve the desired performance enhancements when using partial response pulse shaping, various aspects of operations and/or functions that may be required for providing end-to-end communicability may be configured and/or adjusted to account for the partial response (and particularly, for the presence of substantial ISI). With respect to the filtering operations, in PR-based implementations, the number of taps and/or the values of the tap coefficients of the Tx pulse shaper 410 and the Rx pulse shaper 420 (e.g., as determined by the filtering manager 430) may be designed such that the pulse shaper intentionally may be non-optimal in terms of noise tolerance in order to improve tolerance of nonlinearity. In this regard, the PR pulse shaping providing by the Tx pulse shaper 410 and the Rx pulse shaper 420 may offer superior performance in the presence of nonlinearity as compared to, for example, the conventional root raised cosine (RRC) pulse shaping filters. In this regard, the PR communication path may be designed and/or configured such that effects of the substantial ISI may be mitigated and/or accounted for based on use of a specifically configured estimation process, as described, for example, in the United States patent application titled "Low-Complexity, Highly-Spectrally-Efficient Communications," which is incorporated herein by reference, as set forth above.

In various embodiments, the design and configuration of the pulse shape filtering (i.e. transmit-side and/or receive-side filters) may be based on optimization processes, which may be configured to achieve and/or balance between several objectives. Furthermore, the filtering optimization processes may be subject to implementation-specific performance-related parameters, variables, constraints, and/or cost functions, which may be defined for particular desired optimization. In this regard, the one or more performance-related parameters may pertain to the filtering itself and/or other aspects of the communication that may be affected by it (e.g., error measurements). The constraints may comprise particular limits or requirements, which may apply to, for example, the performance-related variables and/or the filters (or their configuration). For example, spectral mask limits and/or compliance therewith may be constraint in any filtering configuration or optimization thereof. The cost functions may be defined over one or more performance-related parameters or variables—e.g., specifying the filter configuration (for example, filter tap coefficient values) is to be optimized based on a function of one or more variables. The cost functions may, in some instances, specify different weights to pertinent parameters or variables. The implementation-specific parameters, variables, constraints and/or cost functions may be defined by system designers or operators, such as via user input (which may be provided as part of the control data 442). Thus, the filter optimization process may provide optimal filtering configuration that may achieve the primary objective (s), as applied to the cost functions to meet (as much as possible) the specified performance-related parameters or variables, while complying with the specified constraints. The use of filter optimization processes for the design and configuration of filters and/or filtering design and/or configuration for partial response pulse shaping is described in more detail in the United States patent application titled "Design and Optimization of Partial Response Pulse Shape Filter," which is incorporated herein by reference, as set forth above.

In an embodiment of the invention, dynamic and/or real-time adjustments may be applied to filters/filtering design or configuration, such as to ensure highly-spectrally-efficient communications. For example, the filtering manager 430 may be configured to determined and/or apply dynamic or real-time adjustments of filters/filtering configuration and/or operations—i.e. the filters/filtering adjustments may be determined based on real-time and/or dynamic changes (e.g., in response to signals currently, or recently, communicated), with the adjustment being applied during operations of the communication system. In this regard, various conditions, functions, and/or operational criteria may affect partial-response-based communications, particularly pulse shaping (and thus filters/filtering) pertaining thereto. For example, voltage and/or temperature changes in the transmitter and/or receiver may affect the pulse shape filtering. Therefore, changes to such conditions, functions, and/or criteria may require adjustments to filters/filtering, such as to maintain or achieve optimal partial-response-based pulse shaping. To enable such dynamic and/or real-time adjustments, the filtering manager 430 may be configured to obtain data pertaining to pertinent conditions, functions, and/or criteria which may be affect partial-response-based communication, particularly pulse shaping related functions. For example, the filtering manager 430 may be configured to receive the Tx_side feedback 462, the Rx_side feedback 464, and/or the channel feedback 466. In this regard, the Tx_side feedback 462 may comprise information relating to the transmit-side, such as communication-related data (e.g., settings, parameters, or measurements), and/or data relating to resources availability or utilization. For example, the Tx_side feedback 462 may comprise data reporting and/or relating to applicable spectral masks, backoff settings of a power amplifier in the transmitter, a clock frequency in the transmitter, or local oscillator frequency in the transmitter, a mode of operation (e.g., "high performance" or "power save") of the transmitter, a modulation type being used, a modulation order being used, frequency being used for timing pilot, temperature. Similarly, the Rx_side feedback 464 may comprise information relating to the receive-side, such as communication related data (e.g., settings, parameters, or measurements), and/or data relating to resources availability or utilization. For example, the Rx_side feedback 464 may comprise data reporting and/or relating to LNA configuration, clock/LO frequencies, values of sequence estimation parameters (e.g., parameters P, PSu, Su, Q, q1, q2, q3 as described in the United States patent application titled "Low-Complexity, Highly-Spectrally-Efficient Communications," which is incorporated herein by reference, as set forth above), temperature, and/or measured performance indicators (SNR, SER, BER, sequence estimation metrics, equalization error, etc.). The channel feedback 466 may comprise information relating to interfaces(s) available between the transmit-side and the receive-side and/or channels on which communication may (or are) being carried. For example, the channel feedback 466 may comprise data relating to channel fading, channel frequency response, noise levels, adjacent channel interferers, and the like.

In an example embodiment, adjustments may be bi-directional—that is, in addition to adjusting filters/filtering in response to changes in the Tx_side feedback 462 and/or the Rx_side feedback 464, the Tx_side feedback 462 and/or the Rx_side feedback 464 may be changed in response to changes in the filtering.

The filtering manager 430 may then analyze the obtained data (e.g., via the processing component 434), and may determine, based on that analysis, whether (re)configuration of and/or adjustment to current filters/filtering configuration/operations may be required. For example, the filtering manager 430 may determine filtering configurations which may enable optimizing filtering configuration and/or operations based on a particular set of conditions (or changes thereto), as indicated by the received data (i.e. the Tx_side feedback 462, the Rx_side feedback 464, and/or the channel feedback 466), for a particular objective (e.g., achieving optimal partial response pulse shaping, such as by selecting and/or applying optimized filtering design/configuration). This may be achieved by, for example, re-applying optimization processes implemented by the filtering manager 430 to determine new optimized filtering configuration (and/or adjustments to currently utilized filtering configurations), examples of which are described in the United States patent application titled "Design and Optimization of Partial Response Pulse Shape Filter," which is incorporated herein by reference, as set forth above.

In an embodiment, filters/filtering configuration may be adapted to provide dynamic adjustments based on channel conditions and/or any variations thereof. In this regard, partial response (and thus filters/filtering relating thereto) may be affected by particular channel conditions. Examples of channel conditions (or variations thereof) may comprise channel attenuation (fading), which has impact on signal-to-noise ratio (SNR), multipath (selective fading), and received interference signals. In some instances, pertinent channel conditions may be accounted and/or compensated for by one or both of the transmit-side and the receive-side (but preferably concurrently by both the transmit-side and the receive-side, for best performance). For example, flat channel attenuation may be compensated for, such as by adapting transmit (Tx) power (in the Tx pulse shaper 410), as well as supporting receiver (Rx) dynamic range (in the Rx pulse shaper 420). Multipath can be compensated for by the receive-side equalization, which may incorporate, for example, a noise enhancement penalty. In addition, in some instances multipath may partially be addressed by use of transmit-side equalization, which advantageously may not suffer from the noise enhancement as in the case of the receive-side equalization. In this regard, use of partial-response-based communications may allow for use of equalization in the transmitter since introducing (controlled) ISI is acceptable (and mainly part of the partial response scheme). As result of the use of transmit-side equalization, however, noise may not be enhanced as much in the receive-side equalization. Thus, in instances, desired total equalization may be achieved based on combining of transmit-side and receive-side equalization—i.e. only "partial" equalization may be performed in the transmit-side (i.e. in the Tx pulse shaper 410), with the remaining equalization being performed in the receive-side (i.e. in the Rx pulse shaper 420).

With respect to interference signals, the Rx pulse shaper 420 (particularly filters therein and/or filtering operations performed thereby) may be adaptively configured to nullify interference. Such adaptation may, however, cause particular degradations, such as noise enhancement. Thus, in some instances, the transmit-side and receive-side filters may be adapted, to achieve better performance. In this regard, the filters' adaption may be associated with impact for particular partial response modulation attributes, such as minimum distance reduction, early taps amplitude, and/or uncompensated preceding response, which may be considered in the adaptation optimization. For example, the transmit-side and receive-side filters may adapt dynamically to optimize BER, SER and/or throughput performance, and to improve stability under channel variations and interferences mentioned above. The optimization objectives could be subject to the constrains that are applied in the filters design/optimization process—e.g., spectrum mask, minimum distance reduction, receiver noise enhancement, receiver adjacent rejection, receiver anti-aliasing, early taps amplitude and the uncompensated preceding response (floor). In this regard, although the SER and BER may be highly coupled, and BER may typically improve when SER improves, it is possible that BER may not provide the expected improvement for a given SER improvement due to possible dependency within symbol errors and/or the characteristics of the forward error correction (FEC) or channel coding being used. In this regard, in some instances the best BER performance for a given SER may result from less dependency within the symbol errors—i.e. when symbol errors have less bursty nature. The statistical length of a symbol error burst may depend, for example, on the time domain profile of the partial response (e.g., taps amplitude). In instances where the partial response decays fast (e.g., within a small number of taps), it may assure shorter bursts of symbol error, but it may impact other important attributes of the partial response, such as early taps amplitude and uncompensated preceding response, which are related to the overall performance. Therefore the BER may be considered for the optimization along with the SER.

Accordingly, filters/filtering configuration may be adapted to provide dynamic adjustments based on variations in pertinent channel conditions, which may be determined by incorporation of real-time measurements thereof (and which may be reported to the filtering manager 430 via one or more of Tx_side feedback 462, the Rx_side feedback 464, and/or the channel feedback 466), and/or based on any adjustment or modifications applied to functions or components used in the transmit-side and/or the receive-side (e.g., to account for changes in channel conditions). Such filtering adaption may be achieved, for example, by accounting for the possibility of channel conditions changes as part of the filters/filtering design or configuration optimization. For example, channel conditions, and/or any means or functions adapted to handle or compensate for the channel conditions (e.g., in one or both of the transmit-side and the receive-side), may be treated as performance-variables and/or constraints used by the optimization process for determining optimized filtering configurations. Accordingly, any channel conditions changes, which may affect filters/filtering, may be accounted for and/or compensated for by applying the optimization process, and thus re-applying the optimization process may result in reconfiguring (or adjusting) the filters or operations thereof, to account for these changes.

In an example embodiment, filters/filtering configuration may be adapted to provide dynamic adjustments based on changes in noise related performance or characteristics. In this regard, partial response pulse shaping (and thus filters/filtering relating thereto) may be affected by various noise characteristics, such as the noise characteristics of the channel and/or the nonlinearity characteristic of the transmit-side and/or the receiver-side. In this regard, transmit-side non-linearities may occur, for example, in case of transmit power adjustment—e.g., due to use of adaptive transmit power control (ATPC) to compensate for channel conditions. At the receiver, receive-side non-linearities may change, such as due to changes in received signal level (RSL), which may be affected by channel conditions. Accordingly, filters/filtering configuration may be adapted to provide dynamic adjustments based on variations in noise characteristics, which may be determined by incorporation of real-time measurements or tracking thereof (and which may be reported to the filtering manager 430 via one or more of Tx_side feedback 462, the Rx_side feedback 464, and/or the channel feedback 466), and/or based on any adjustment or modifications applied to functions or components used in the transmit-side and/or the receive-side (e.g., to account for changes in noise characteristics). Such filtering adaption may be achieved, for example, by accounting for the possibility of noise or non-idealities changes as part of the filters/filtering design or configuration optimization. For example, pertinent noise or non-idealities (e.g., nonlinearity or channel noise), may be treated as performance-variables and/or constraints by the optimization process used for determining optimized filtering configurations. Thus, changes in noise or non-idealities may be accounted for by dynamically reapplying the optimization process, resulting in dynamic reconfiguring (or adjusting) of the filters or operations thereof, to account for these changes.

In an example embodiment, locally stored data may be used during filter/filtering reconfigurations at the transmit-side and/or the receive-side. In this regard, in many instances, changes to filters/filtering configuration may require concurrent adjustments at the transmit-side and the receive-side (e.g., because any variation in the pulse shaping applied at the transmit-side would require corresponding change at the receive-side, to account for the modified pulse shape). For example, a transmit-side (Tx) configuration database 472 (which may also be implemented as a look-up table, or any other data structure that may be suitable) and a receive-side (Rx) configuration database 474 (which may also be implemented as a look-up table, or any other suitable data structure) may be predefined at the transmit-side and the receive-side, respectively. In this regard, the databases 472 and 474 may be populated by different possible filter/filtering configurations, such as by applying the optimization process (e.g., real-time or in simulation) based on different conditions, to generate these different configurations. Accordingly, when a change occurs that affects a communicated partial response signal, the configuration adjustments or modifications at the transmit-side and receive-side (shown as 482 and 484, respectively) may simply be read from the local databases 472 and 474. The filters/filtering (re)configuration and/or adjustments at the transmit-side and receive-side may be executed synchronously (e.g., synchronize the timing of application of filters/filtering changes), such as using bi-directional control channel between transmitter and the receiver. Such approach may be desirable in instances where the filtering manager 430 may not be deployed along with the transmitter and the receiver during actual use (e.g., built by different manufacturers and/or at different times).

Figure 5:
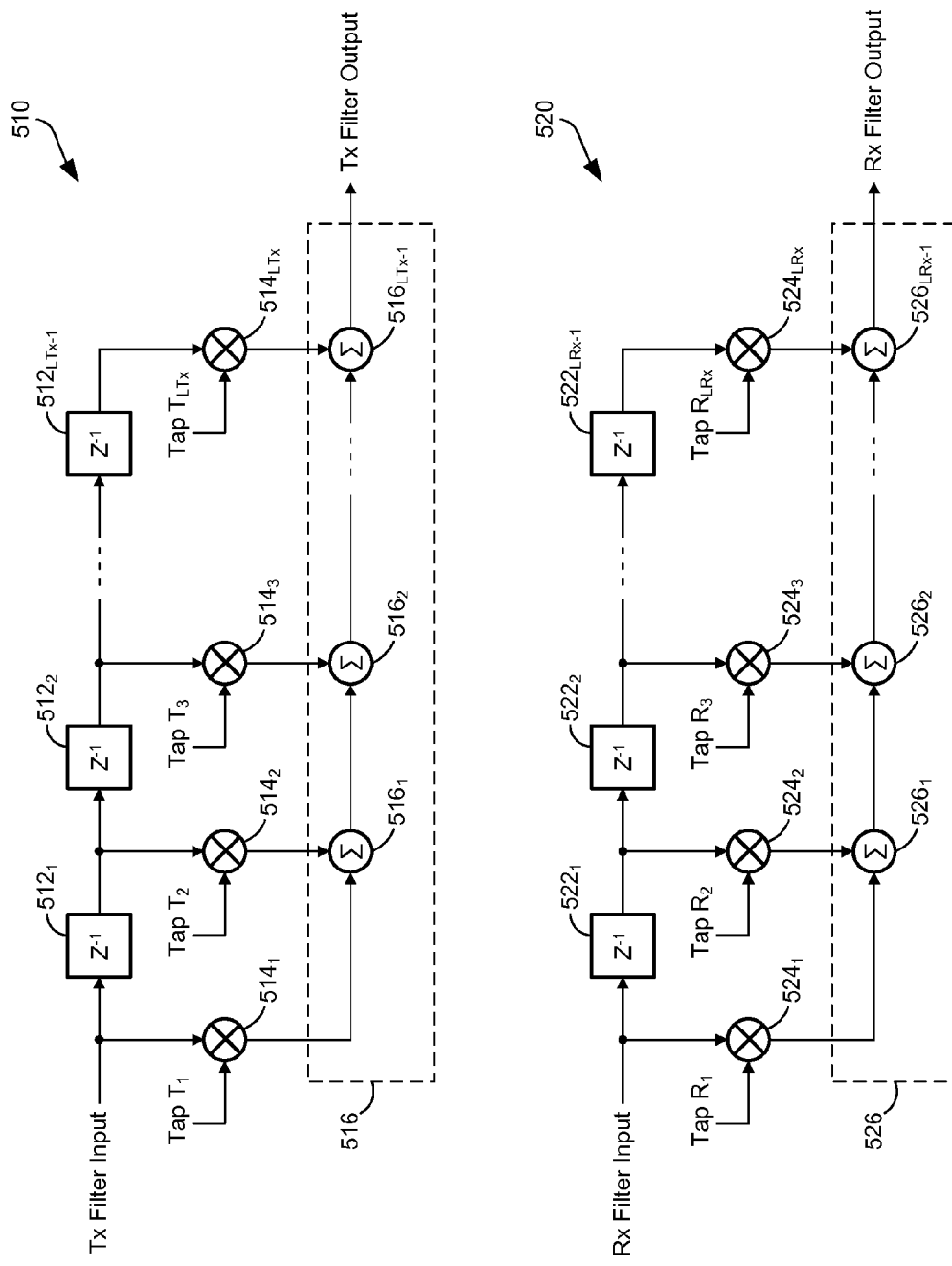
FIG. 5 is a block diagram depicting an example finite impulse response (FIR) implementation of partial response pulse-shaping filters, in accordance with an embodiment of the present invention.

FIG. 5 is a block diagram depicting an example finite impulse response (FIR) implementation of partial response pulse-shaping filters, in accordance with an embodiment of the present invention. Referring to FIG. 5, there is shown a transmit (Tx) filter 510 and a receive (Rx) filter 520. In this regard, the Tx filter 510 and the Rx filter 520 may correspond to the Tx pulse shaper 410 and the pulse shaper 420 (or at least the filtering components/functions thereof), respectively.

In the example embodiment shown in FIG. 5, the Tx filter 510 and the Rx filter 520 may be implemented as finite impulse response (FIR) filters. It is understood, however, that the invention is not so limited, and that the FIR implementation is provided as non-limiting example embodiment.

The Tx filter 510 may be configured as FIR of LTx-1 order—i.e. having LTx taps. In this regard, the Tx filter 510 comprise a plurality of delay (e.g., Z transform, applied as $z^{-1}$ operator) elements $512_1$-$512_{LTx-1}$, a plurality of multipliers $514_1$-$514_{LTx}$ (for applying a plurality of corresponding tap coefficients or weights: $T_1$-$T_{LTx}$), and an accumulator 516 (which may be implemented using a plurality of combiners $516_1$-$516_{LTx-1}$, which may connected in series—such that to allow accumulating the weighted sum of the current and a finite number of previous values of the Tx filter input).

Similarly, the Rx filter 520 may be configured as FIR of LRx-1 order—i.e. having LRx taps. In this regard, the Rx filter 520 comprise a plurality of delay (e.g., Z transform, applied as $z^{-1}$ operator) elements $522_1$-$522_{LRx-1}$, a plurality of multipliers $524_1$-$524_{LRx}$ (for applying a plurality of corresponding tap coefficients or weights: $T_1$-$T_{LRx}$), and an accumulator 526 (which may be implemented using a plurality of combiners $526_1$-$526_{LRx-1}$, which may connected in series—such that to allow accumulating the weighted sum of the current and a finite number of previous values of the Rx filter input).

In operation, the Tx filter 510 (operating in the transmitter) and the Rx filter 520 (operating in the receiver) may be used to provide the required overall filtering during communications, particularly to provide pulse shaping and noise rejection. For example, in some instances the Tx filter 510 and the Rx filter 520 may be configured provide a total partial response, as described in FIGS. 1-4 for example. In this regard, the number and values of the filters taps (i.e. number of taps at the transmit-side and receive-side: LTx and LRx, and the values of the transmit-side and receive-side tap coefficients: $T_1$-$T_{LTx}$ and $R_1$-$R_{LRx}$) may be determined based on application of filtering optimization that may be tailored for partial-response-based paths, substantially as described with respect to FIG. 4 for example.

In various embodiments of the invention, communication systems implementing partial-response-based communications may be configured to support real time, dynamic adjustments to filters/filtering configurations or operations. For example, the number of taps (i.e. LTx and LRx) and/or the tap coefficients (i.e. one or more of $T_1 \ldots T_{LTx}$ and/or $R_1 \ldots R_{LRx}$) may be modified dynamically, such as by re-application of the filtering optimization processes, to account for any changes that may require (or enable) modifications to the pulse shaping to achieve optimal partial-response-based communication performance.

Figure 6:
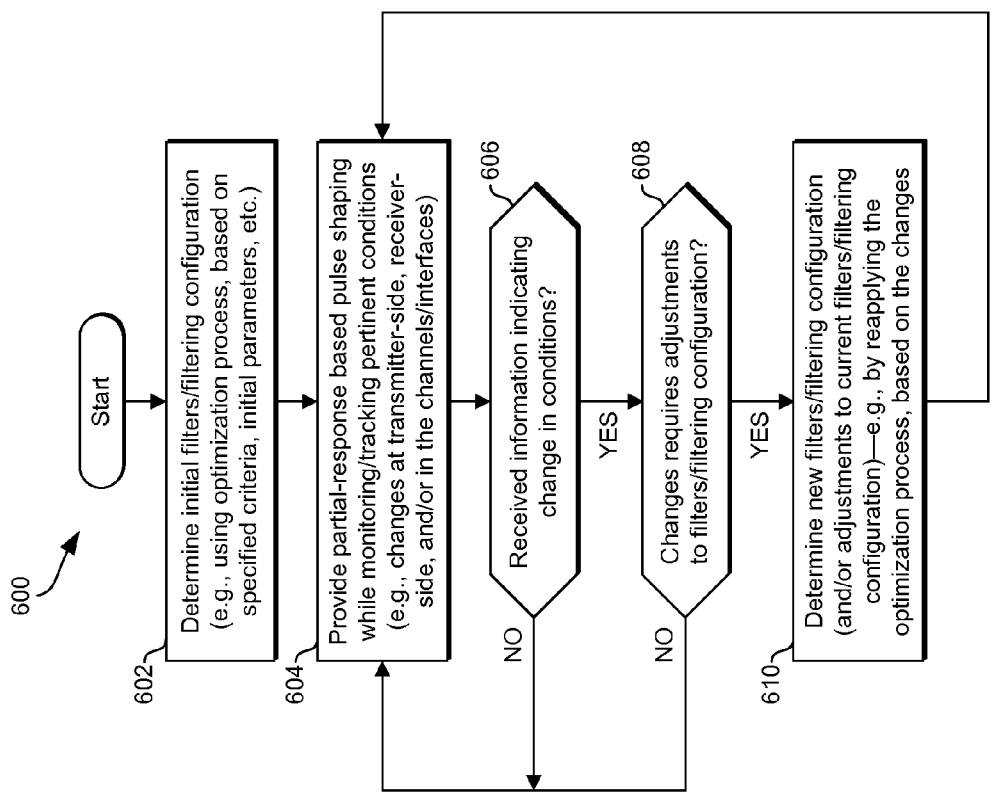
FIG. 6 is a flow chart depicting an example of a process for dynamic adjustment of pulse-shaping filters, in accordance with an embodiment of the present invention.

FIG. 6 is a flow chart depicting an example of a process for dynamic adjustment of pulse-shaping filters, in accordance with an embodiment of the present invention. Referring to FIG. 6, there is shown a flow chart 600 comprising a plurality of exemplary steps for supporting dynamic adjustments of partial response pulse-shaping filters.

In step 602, initial filters/filtering configuration (e.g., using optimization process, based on specified criteria, initial parameters, etc.) may be determined. An example of filters/filtering configuration in accordance with an optimization process is described in more detail in the United States patent application titled "Design and Optimization of Partial Response Pulse Shape Filter," which is incorporated herein by reference, as set forth above. In step 604, partial-response-based pulse shaping may be provided in the communication path (e.g., using transmit-side pulse shaper 410 and receive-side pulse shaper 420), based on the currently applied filters/filtering configuration. Furthermore, during such PR based communications, pertinent conditions (e.g., changes at transmit-side, at receive-side, and/or in the channels/interfaces) may be monitored or tracked. In step 606, it may be determined whether information indicating change in conditions had been received or obtained. In instances where no such information is received or obtained, the process may loop back to step 604. In instances where such information is received or obtained, the process may proceed to step 608.

In step 608, it may be determined whether the received/obtained information pertaining to relevant conditions may necessitate adjustments to the pulse-shaping (particularly, to filters/filtering configurations or operations). In instances where it is determined that no adjustments are needed, the process may loop back to step 604. In instances where it may be determined that adjustments may be needed, the process may proceed to step 610. In step 610, new filters/filtering configuration (and/or adjustments to current filters/filtering configuration) may be determined, such as by reapplying the optimization process (as described in step 602), based on the received/obtained changes.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for dynamic filter adjustment for highly spectrally efficient communications.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present methods and/or apparatus may have been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A method comprising:
utilizing pulse-shaping filtering for communication of data, wherein the pulse-shaping filtering incorporates a predetermined substantial amount of inter-symbol interference (ISI);
obtaining data relating to the pulse-shaping filtering, and/or to a channel and/or an interface used in the communication of data; and
adjusting the pulse-shaping filtering based on the obtained data, wherein the adjusting of the pulse-shaping filtering comprises adjusting configuration and/or operations of one or more filters utilized in performing the pulse-shaping, the one or more filters comprising a transmit-side filter and/or a receive-side filter.

2. The method of claim 1, wherein the pulse-shaping filtering comprises use of a transmit-side pulse-shaping filter and/or a receive-side pulse-shaping filter to provide a determined total partial response.

3. A method comprising:
utilizing pulse-shaping filtering for communication of data, wherein the pulse-shaping filtering incorporates a predetermined substantial amount of inter-symbol interference (ISI);
obtaining data relating to the pulse-shaping filtering, and/or to a channel and/or an interface used in the communication of data; and
adjusting the pulse-shaping filtering based on the obtained data, wherein the adjusting of the pulse-shaping filtering comprises applying a new filtering configuration or applying changes to a currently applied filtering configuration.

4. The method of claim 3, comprising determining the new filtering configuration and/or the changes to the currently applied filtering configuration based on applying of an optimization process.

5. The method of claim 4, comprising applying the optimization process based on, at least in part, a plurality of constraints and a plurality of performance-related variables.

6. The method of claim 4, wherein the optimization process comprises optimizing at least one of a tap configuration, a number of taps, and one or more of a plurality of tap coefficients.

7. A method comprising:
utilizing pulse-shaping filtering for communication of data, wherein the pulse-shaping filtering incorporates a predetermined substantial amount of inter-symbol interference (ISI);
obtaining data relating to the pulse-shaping filtering, and/or to a channel and/or an interface used in the communication of data; and
adjusting the pulse-shaping filtering based on the obtained data; and
determining one or more parameters required for the adjusting of the pulse-shaping filtering based on locally stored databases that map changes affecting filtering to filtering configuration or operations parameters.

8. A method comprising:
utilizing pulse-shaping filtering for communication of data, wherein the pulse-shaping filtering incorporates a predetermined substantial amount of inter-symbol interference (ISI);
obtaining data relating to the pulse-shaping filtering, and/or to a channel and/or an interface used in the communication of data; and
adjusting the pulse-shaping filtering based on the obtained data; and
synchronizing configuration or modification applicable at each of transmit-side and receive-side based on the adjusting of the pulse-shaping filtering.

9. A method comprising:
utilizing pulse-shaping filtering for communication of data, wherein the pulse-shaping filtering incorporates a predetermined substantial amount of inter-symbol interference (ISI);
obtaining data relating to the pulse-shaping filtering, and/or to a channel and/or an interface used in the communication of data, wherein the obtained data comprises receive-side feedback information, transmit-side feedback information, and/or channel feedback information provided during communication; and
adjusting the pulse-shaping filtering based on the obtained data.

10. A method comprising:
utilizing pulse-shaping filtering for communication of data, wherein the pulse-shaping filtering incorporates a predetermined substantial amount of inter-symbol interference (ISI);
obtaining data relating to the pulse-shaping filtering, and/or to a channel and/or an interface used in the communication of data, wherein the obtained data comprises transmitter power level, receiver power level, and/or N-QAM modulation type; and
adjusting the pulse-shaping filtering based on the obtained data.

11. A method comprising:
utilizing pulse-shaping filtering for communication of data, wherein the pulse-shaping filtering incorporates a predetermined substantial amount of inter-symbol interference (ISI), wherein the predetermined amount of inter-symbol interference (ISI) is greater than an inter-symbol interference (ISI) practically allowed in communication using zero or near-zero ISI filtering that complies with same transmitted spectrum mask limitation as the said pulse-shaping filtering;
obtaining data relating to the pulse-shaping filtering, and/or to a channel and/or an interface used in the communication of data; and
adjusting the pulse-shaping filtering based on the obtained data.

12. A system, comprising:
one or more circuits for performing pulse-shaping filtering during communication of data, wherein:
the pulse-shaping filtering incorporates a predetermined substantial amount of inter-symbol interference (ISI);
the one or more circuits are operable to obtain, during communication, data relating to the pulse-shaping filtering, and/or to a channel and/or an interface used in the communication of data;
the one or more circuits are operable to adjust, during communication, the pulse-shaping filtering based on the obtained data; and
the adjusting of the pulse-shaping filtering comprises adjusting configuration and/or operations of one or more filters utilized in performing the pulse-shaping, the one or more filters comprising a transmit-side filter and/or a receive-side filter.

13. The system of claim 12, wherein the pulse-shaping filtering comprises use of a transmit-side pulse-shaping filter and/or a receive-side pulse-shaping filter to provide a determined total partial response.

14. The system of claim 12, wherein the obtained data comprises transmitter power level, receiver power level, and/or N-QAM modulation type.

15. The system of claim 12, wherein the predetermined substantial amount of inter-symbol interference (ISI) is greater than an inter-symbol interference (ISI) practically allowed in communication using zero or near-zero ISI filtering that complies with a same transmitted spectrum mask limitation as the pulse-shaping filtering.

16. A system, comprising:
one or more circuits for performing pulse-shaping filtering during communication of data, wherein:
the pulse-shaping filtering incorporates a predetermined substantial amount of inter-symbol interference (ISI);
the one or more circuits are operable to obtain, during communication, data relating to the pulse-shaping filtering, and/or to a channel and/or an interface used in the communication of data;
the one or more circuits are operable to adjust, during communication, the pulse-shaping filtering based on the obtained data; and
the adjusting of the pulse-shaping filtering comprises applying a new filtering configuration or applying changes to a currently applied filtering configuration.

17. The system of claim 16, wherein the one or more circuits are operable to determine the new filtering configuration and/or the changes to the currently applied filtering configuration based on applying of an optimization process.

18. The system of claim 17, wherein the one or more circuits are operable to apply the optimization process based on, at least in part, a plurality of constraints and a plurality of performance-related variables.

19. The system of claim 17, wherein the optimization process comprises optimizing at least one of a tap configuration, a number of taps, and one or more of a plurality of tap coefficients.

20. The system of claim 16, wherein the obtained data comprises transmitter power level, receiver power level, and/or N-QAM modulation type.

21. The system of claim 16, wherein the predetermined substantial amount of inter-symbol interference (ISI) is greater than an inter-symbol interference (ISI) practically allowed in communication using zero or near-zero ISI filtering that complies with a same transmitted spectrum mask limitation as the pulse-shaping filtering.

22. A system, comprising:
one or more circuits for performing pulse-shaping filtering during communication of data, wherein:
the pulse-shaping filtering incorporates a predetermined substantial amount of inter-symbol interference (ISI);
the one or more circuits are operable to obtain, during communication, data relating to the pulse-shaping filtering, and/or to a channel and/or an interface used in the communication of data;
the one or more circuits are operable to adjust, during communication, the pulse-shaping filtering based on the obtained data; and
the one or more circuits are operable to determine one or more parameters required for the adjusting of the pulse-shaping filtering based on locally stored databases that map changes affecting filtering to filtering configuration or operations parameters.

23. The system of claim 22, wherein the obtained data comprises transmitter power level, receiver power level, and/or N-QAM modulation type.

24. The system of claim 22, wherein the predetermined substantial amount of inter-symbol interference (ISI) is greater than an inter-symbol interference (ISI) practically allowed in communication using zero or near-zero ISI filtering that complies with a same transmitted spectrum mask limitation as the pulse-shaping filtering.

25. A system, comprising:
one or more circuits for performing pulse-shaping filtering during communication of data, wherein:
the pulse-shaping filtering incorporates a predetermined substantial amount of inter-symbol interference (ISI);
the one or more circuits are operable to obtain, during communication, data relating to the pulse-shaping filtering, and/or to a channel and/or an interface used in the communication of data;
the one or more circuits are operable to adjust, during communication, the pulse-shaping filtering based on the obtained data; and
the one or more circuits are operable to synchronize configuration or modification applicable at each of transmit-side and receive-side based on the adjusting of the pulse-shaping filtering.

26. The system of claim 25, wherein the obtained data comprises transmitter power level, receiver power level, and/or N-QAM modulation type.

27. The system of claim 25, wherein the predetermined substantial amount of inter-symbol interference (ISI) is greater than an inter-symbol interference (ISI) practically allowed in communication using zero or near-zero ISI filtering that complies with a same transmitted spectrum mask limitation as the pulse-shaping filtering.

28. A system, comprising:
one or more circuits for performing pulse-shaping filtering during communication of data, wherein:
the pulse-shaping filtering incorporates a predetermined substantial amount of inter-symbol interference (ISI);
the one or more circuits are operable to obtain, during communication, data relating to the pulse-shaping filtering, and/or to a channel and/or an interface used in the communication of data;
the obtained data comprises receive-side feedback information, transmit-side feedback information, and/or channel feedback information provided during communication; and
the one or more circuits are operable to adjust, during communication, the pulse-shaping filtering based on the obtained data.

29. The system of claim 28, wherein the predetermined substantial amount of inter-symbol interference (ISI) is greater than an inter-symbol interference (ISI) practically allowed in communication using zero or near-zero ISI filtering that complies with a same transmitted spectrum mask limitation as the pulse-shaping filtering.

30. A system, comprising:
one or more circuits for performing pulse-shaping filtering during communication of data, wherein:
the pulse-shaping filtering incorporates a predetermined substantial amount of inter-symbol interference (ISI);
the one or more circuits are operable to obtain, during communication, data relating to the pulse-shaping filtering, and/or to a channel and/or an interface used in the communication of data, wherein the obtained data comprise a transmitter power level, receiver power level, and/or N-QAM modulation type; and
the one or more circuits are operable to adjust, during communication, the pulse-shaping filtering based on the obtained data.

31. The system of claim 30, wherein the predetermined substantial amount of inter-symbol interference (ISI) is greater than an inter-symbol interference (ISI) practically allowed in communication using zero or near-zero ISI filtering that complies with a same transmitted spectrum mask limitation as the pulse-shaping filtering.

32. A system, comprising:
one or more circuits for performing pulse-shaping filtering during communication of data, wherein;
the pulse-shaping filtering incorporates a predetermined substantial amount of inter-symbol interference (ISI)
the predetermined substantial amount of inter-symbol interference (ISI) is greater than an inter-symbol interference (ISI) practically allowed in communication using zero or near-zero ISI filtering that complies with a same transmitted spectrum mask limitation as the pulse-shaping filtering;
the one or more circuits are operable to obtain, during communication, data relating to the pulse-shaping filtering, and/or to a channel and/or an interface used in the communication of data; and
the one or more circuits are operable to adjust, during communication, the pulse-shaping filtering based on the obtained data.

33. The system of claim 32, wherein the obtained data comprises transmitter power level, receiver power level, and/or N-QAM modulation type.

34. A system, comprising:
one or more circuits for performing pulse-shaping filtering during communication of data, wherein:
the pulse-shaping filtering incorporates a predetermined substantial amount of inter-symbol interference (ISI);
the one or more circuits are operable to obtain, during communication, data relating to the pulse-shaping filtering, and/or to a channel and/or an interface used in the communication of data;
the one or more circuits are operable to adjust, during communication, the pulse-shaping filtering based on the obtained data;
a filtering manager that is configured to manage the adjusting of the pulse-shaping filtering based on the obtained data; and
the filtering manager is implemented as a stand-alone device, and/or in distributed manner over transmitter, receiver, and/or the stand-along device.

35. The system of claim 34, wherein the predetermined substantial amount of inter-symbol interference (ISI) is greater than an inter-symbol interference (ISI) practically allowed in communication using zero or near-zero ISI filtering that complies with a same transmitted spectrum mask limitation as the said pulse-shaping filtering.

36. The system of claim 34, wherein the obtained data comprises transmitter power level, receiver power level, and/or N-QAM modulation type.

* * * * *